US 6,640,847 B2

(12) United States Patent
Verhoeven

(10) Patent No.: US 6,640,847 B2
(45) Date of Patent: Nov. 4, 2003

(54) DEVICE FOR DISTRIBUTING LIQUID TO A NUMBER OF CONSUMERS, AND DRINKS MACHINE PROVIDED WITH A DEVICE OF THIS TYPE

(75) Inventor: Romanus Eduard Verhoeven, Heerhugowaard (NL)

(73) Assignee: Bravilor Holding B.V., Heerhugowaard (NL)

( * ) Notice: Subject to any disclaimer, the term of this patent is extended or adjusted under 35 U.S.C. 154(b) by 0 days.

(21) Appl. No.: 10/111,030

(22) Filed: Apr. 18, 2002

(65) Prior Publication Data
US 2003/0098088 A1 May 29, 2003

(30) Foreign Application Priority Data
Dec. 6, 1999 (NL) .............................................. 1013769

(51) Int. Cl.[7] ................................................ B65B 1/04
(52) U.S. Cl. ......................... 141/98; 141/268; 141/284
(58) Field of Search ................................. 141/267, 268, 141/270, 279, 283, 284, 98, 100–105; 222/129, 129.1, 144.5, 160, 461, 132

(56) References Cited

U.S. PATENT DOCUMENTS

| 479,812 | A | * | 8/1892 | Johnston | ...................... | 141/133 |
| 4,258,759 | A | * | 3/1981 | Achen | ........................ | 141/100 |
| 4,850,304 | A | * | 7/1989 | Nicholson | ................... | 118/694 |
| 5,881,922 | A | | 3/1999 | Hawkins et al. | | |
| 6,308,751 | B1 | * | 10/2001 | Fitzgerald et al. | .......... | 141/270 |

FOREIGN PATENT DOCUMENTS

| EP | 0107883 | 5/1984 |
| EP | 0151500 | 8/1985 |
| EP | 0777073 | 6/1997 |
| FR | 2288359 | 5/1976 |

OTHER PUBLICATIONS

PCT/NL00/00875 International Search Report dated May 16, 2001.

* cited by examiner

Primary Examiner—Steven O. Douglas
(74) Attorney, Agent, or Firm—Handal & Morofsky

(57) ABSTRACT

The invention relates to a device for distributing liquid to a number of consumers, in particular for use in a drinks machine. The device comprises a number of receptacles which are positioned next to one another which corresponds to the number of consumers, a liquid feed line having an outlet opening which opens out above the receptacles, and manipulation means for positioning the outlet opening above a specific receptacle by manipulation of the relative position of the outlet opening, on the one hand, and the receptacle, on the other hand. At the outlet end of the feed line, there is provided a cover which extends laterally with respect to the liquid feed line and extends at least as far as the receptacles which adjoin the receptacle which is to be supplied. The cover may extend as far as above the said adjacent receptacles and may even completely overlap the said receptacles. The cover may also extend over all the receptacles.

20 Claims, 1 Drawing Sheet

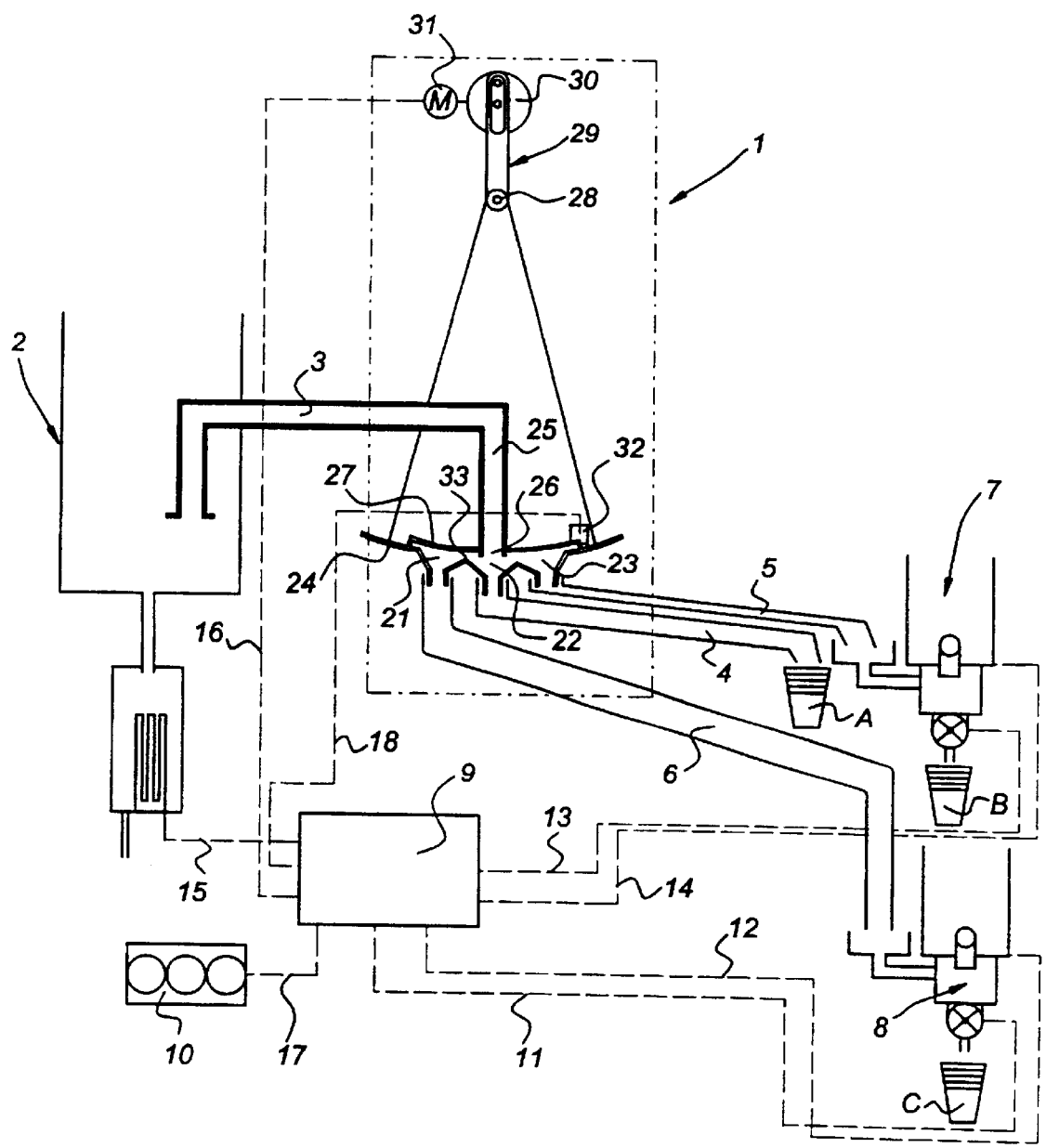

DEVICE FOR DISTRIBUTING LIQUID TO A NUMBER OF CONSUMERS, AND DRINKS MACHINE PROVIDED WITH A DEVICE OF THIS TYPE

The present invention relates to a device for distributing liquid to a number of consumers, in particular in a drinks machine, comprising:

a number of receptacles which are positioned next to one another corresponding to the number of consumers;

a liquid feed line having an outlet opening which opens out above the receptacles;

manipulation means for positioning the outlet opening above a specific receptacle which is to be supplied, by manipulation of the relative position of the outlet opening, on the one hand, and the receptacles, on the other hand, A device of this type is known, for example, from EP-A-0 151 500. In this device, there are four receptacles which are separated by partitions and have a flexible liquid feed line positioned above them. This flexible liquid feed line can be flexibly and resiliently pivoted, or more accurately bent, by means of a manipulation system, in such a manner that its outlet opening is situated above one of the receptacles as desired. The positioning means are actuated from a control system.

A drawback of distribution systems of this type is that when water, such as hot water, flows into them, water splashes up, and particularly in the case of hot water there is an additional drawback that steam or water vapour is released. This splashing water and the steam can then enter the equipment in which the device is fitted at locations where they cause damage or at least may lead to damage and/or may affect, in particular disrupt, operation of the equipment. EP-A-0 151 500 appears to seek to overcome this problem by accommodating the flexible water feed hose, the manipulation mechanism and the receptacles together in a large distribution chamber which is open at the top, cf. item 15 in FIG. 2 of EP-A-0 151 500. A large distribution chamber of this type firstly takes up considerable space, thus making it difficult to achieve a compact design for the equipment in which the distribution device is to be installed, and, moreover, does not overcome the problem which arises in particular with hot water, namely the fact that steam is released.

The object of the present invention is to provide an improved device for distributing liquid to a number of consumers, in particular for use in a drinks machine, which overcomes the above problems.

According to the invention, this object is achieved by the fact that at the outlet end of the liquid feed line there is provided a cover which extends laterally with respect to the liquid feed line and extends as least as far as the receptacles which in each case adjoin the receptacle which is to be supplied. A cover of this type takes up relatively little space, which is of considerable advantage with a view to achieving a compact structure, and in particular presents a barrier to water splashing up from the receptacle which is to be supplied.

According to the invention, water which splashes up from the receptacle to be supplied is retained even more successfully if the cover extends at least as far as above the adjacent receptacles, and preferably overlaps these adjacent receptacles and may even continue further. This also partially prevents steam from escaping. This is because the steam condenses on the cover and can then drip off the cover into adjacent receptacles.

According to the invention, the retention of splashing water, and in particular the retention of steam which is released, is improved still further if the cover extends over all the receptacles. According to an advantageous embodiment of the invention, complete retention of splashing water and steam which is released is achieved if the space above the receptacles is substantially closed off by the cover.

According to an advantageous embodiment of the invention, the receptacles are formed or accommodated in a plate and the cover runs parallel to and along the said plate, the plate and cover being moveable with respect to one another if at least the cover is fixedly connected to the liquid feed line. An embodiment of this type in particular allows a good closure between the interior of the receptacles and the outside world, such as the equipment in which the device for distributing liquid is installed, to be achieved and, moreover, provides good options for manipulating the relative position of the outlet opening, on the one hand, and the receptacles, on the other hand, by means of the manipulation means.

In the case of receptacles which are formed or accommodated in a plate, according to the invention it is particularly advantageous if at least two adjacent receptacles of the said number of receptacles, and preferably all the receptacles, are recessed with respect to the top surface of the plate. In this way, if the outlet of the receptacle which is to be supplied becomes clogged or blocked, it becomes possible for the contents of the receptacle which is to be supplied to overflow into an adjacent receptacle in order thus to run out via the said adjacent receptacle. This also provides the possibility, if large amounts of steam are generated, to allow the steam to escape via adjacent receptacles. A further advantage of the receptacles being recessed with respect to the top surface of the plate is that it is thus possible, during metering of water, to switch over from one receptacle to another receptacle, i.e. to make the outlet opening open out above a different receptacle and thus, for example when used in a drinks machine, to make a mixture of two drinks.

Although in an embodiment of this type the bottom surface of the cover and the top surface of the plate may both be flat, in which case they can slide along one another in order to bring about relative movement, with a view to achieving a compact structure overall, it is preferable if the top surface of the plate and the bottom surface of the cover are curved in the form of an arc of a circle or spherically, with a corresponding radius of curvature, the top surface of the plate preferably being concavely curved and the bottom surface of the cover being convexly curved. Less space is necessary to allow surfaces which are curved in the form of an arc of a circle or spherically in this way to move with respect to one another than with flat surfaces. Furthermore, an additional advantage is that to achieve the said relative movement it is possible to utilize manipulation means which for themselves require relatively little space. It is possible to utilize a pendant which can be moved to and fro by means of a rotor and an eccentric attached thereto. Moreover, a plate with a concavely curved top surface has the advantage that this concave top surface can serve as a type of dish, by which water can be returned to the receptacles.

According to the invention, with a view to on the one hand allowing good drainage out of the receptacles and, on the other hand, to preventing splashing, it is advantageous if the receptacles are of funnel-shaped design.

Although according to the invention the manipulation means, for the purpose of the relative movement of the outlet opening, on the one hand, and the receptacles, on the other hand, for the purpose of movement may act on the outlet opening and/or the receptacles, according to the invention, it is preferable if the manipulation means, for this purpose, are actively connected to the receptacles, and if the receptacles are provided with flexible outlet hoses which allow the receptacles to move with respect to the remainder of the appliance in which the device for the distribution of liquid is installed.

In order that the relative position of the outlet opening with respect to the receptacles is known at all times, according to the invention it is preferable for the device according to the invention to comprise position-detection means for detecting the relative position of the outlet opening and the receptacles with respect to one another, if the position-detection means are actively connected to control means which are designed to actuate the manipulation means as a function of the signal emitted by the position-detection means and of a signal input via actuating means.

The invention also relates to a drinks machine provided with a device for distributing of liquid according to the invention. According to an advantageous embodiment, in this case the inlet end of the liquid feed line is connected to a hot water source.

In the following text, the present invention will be explained in more detail with reference to an exemplary embodiment which is very diagrammatically illustrated in the drawing.

The drawing shows a very diagrammatic view of a drinks machine provided with a device for the distribution of liquid to a number of consumers.

The device for the distribution of liquid to a number of consumers is in this case indicated by the separately delimited block 1. Although the present invention is in no way limited to three consumers, but rather may equally well have more consumers, up to as many as ten or more, only three users A, B and C are shown in the drawing.

The drinks machine comprises a "device for supplying hot water" 2 provided with a volume-measuring system as described in and known from EP-A-0 811 345, which corresponds to NL-A-1003276, both in the name of the applicant. Both the measuring system and the device for supplying hot water are described in the above publications. However, within the context of the present invention it should be or become clear that the device for supplying hot water 2 provided with a volume-measuring system is not necessary with regard to the present invention and may be replaced by similar or other devices. Hot or at least warm water is discharged from device 2, by means of a siphon 3, to the device for the distribution of liquid to a number of consumers, referred to for short as the "distribution device", according to the invention. The siphon 3 also forms the feed line for the said distribution device 1.

The distribution device 1 illustrated, which will be discussed in more detail below, is designed for the distribution of liquid to or between the said consumers. From the distribution device 1, three outlet lines 4, 5 and 6 lead to the respective consumers A, B and C. Outlet line 4 opens directly into a consumer A, in the form of a cup. Therefore, hot water can be fed via outline 4 to a cup. The person using this drinks machine is therefore able to make tea by placing a desired teabag into this cup A, or if appropriate to make a different drink, such as soup, as desired by placing a suitable instant product in cup A. Outlet line 12 leads to a mixing device 7 for instant coffee, for example ordinary coffee. This mixing device 7 will be able to dispense the coffee to consumer B, once again shown in the form of a cup. Outlet line 6 leads to another mixing device for instant coffee, for example espresso. This further mixing device is denoted by 8 and then dispenses the coffee to consumer C, once again illustrated in the form of a cup.

The drinks machine is controlled by means of an electronic control unit 9, which in turn can be actuated from an actuating panel 10.

Via a signal line 11 for actuation, the control device 9 is connected to the mixer unit of the mixing device 8, and via signal line 12 for actuation, the control device 9 is connected to the measuring/storage unit of the mixing device 8. In a corresponding way, the control unit 9 is connected, by means of a signal line 13, to the mixer unit of mixing device 7 and, via signal line 14, to the measuring/storage unit of the mixing device 7. The measuring/storage unit of mixing device 7 and 8 which is actuated by the control unit 9 supplies portions of preset quantities of ingredient to the associated mixer unit of mixing device 7 or 8, respectively. In the exemplary embodiment, each mixer unit of the mixing device 7 and 8 comprises a chamber in which a rapidly rotating, ribbed disc agitates the water and ingredient in such a manner that they are intimately mixed and the ingredient is dissolved rapidly. The control unit is actively connected, via signal line 15, to the device 1 for supplying hot water, which is provided with a measuring system.

Via signal line 17, the control unit is connected to the actuating panel 10. At any rate, in control terms the control unit 9 is connected, in many cases also with signal feedback, via signal line 16, to the manipulation device 29, which is to be discussed in more detail below, for positioning the relative position of the outlet opening of siphon 3 with respect to the receptacles 21, 22, 23 of the distribution device 1, and the control unit 9 can receive a message back concerning the said relative position via signal line 18.

The distribution device 1 according to the invention comprises three funnel-shaped receptacles 21, 22 and 23 which, on account of their dimensions, which in practice are small, may perhaps better be referred to as small receptacles. Receptacle 21 is adjoined by outlet line 6, receptacle 22 is adjoined by outlet line 4 and receptacle 23 is adjoined by outlet line 5. The receptacles 21, 22 and 23 are arranged in a row in a cylindrically curved plate 24. The distribution device 1 also comprises a liquid feed line 3 with an outlet opening 26. The outlet opening 26 projects through a cover 27 in the form of a plate. The outlet part 25 of the feed line 3 will preferably adjoin covering plate 27 in a sealed manner and may, if appropriate, also support covering plate 27.

As can be seen, covering plate 27 is curved in the form of a circle or cylindrically, specifically in such a manner that its active surface is curved convexly downwards. The plate 24 in which the receptacle funnels 21, 23 are arranged is correspondingly curved cylindrically or in the form of a circle, in this case with its active surface curved concavely. The outlet part 25 of the liquid feed line 3 and the covering plate 27 are arranged immovably, and the plate 24 with receptacle funnels 21–23 can move pass them along an arc of a circle. For this purpose, the connection-end lines 4, 5 and 6 on the receptacle funnels are of flexible design. Plate 24 which bears the receptacle funnels 21–23, in order to be moveable along an arc of a circle, is arranged so that it can rotate about pin 28 by means of a pendant structure 29. Pendant structure 29 comprises an arm which an eccentric 30, on which a motor 31, which is activated by the control unit 9, can act in order to move plate 24 together with receptacle funnel 21–23 along an arc of a circle. To enable the relative position of the receptacle funnels 21–23 with respect to the outlet opening 26 to be determined at all times, a sensor 32 is provided, which is able to determine the position of plate 24 and/or of the receptacle funnels 21–23 and, via line 18, can then transmit a signal to the control unit 9.

The drawing also shows that the receptacle funnels 21–23 are recessed with respect to the plate 24. Therefore, a space is left clear between the top side 33 of the receptacle funnels 21–23 and the covering plate 27, which space on the one hand leaves a passage for the outlet opening 26, which projects slightly beneath covering plate 27, and on the other hand allows liquid or steam to escape to the adjacent receptacle funnels.

It should be clear that within the scope of the present invention numerous modifications to the exemplary embodiment which has just been outlined with reference to the drawing are possible. For example, it is conceivable for the plate 24 with receptacle funnels 21–23 to be fixed and to make the end part 25 of the liquid feed line 3 flexible, for example pivotable about point 28. Within the scope of the invention, it is also possible for the curved plate 24 and curved cover 27 to be of flat design. Furthermore, it is conceivable for plate 24 and cover 27 to be curved spherically, so that it is also possible to use a pendant structure to manipulate plate 24 and 27 in, for example, a direction which is perpendicular to the plane of the drawing and thus to provide a greater number of receptacle funnels, which are arranged in a two-dimensional pattern, within a limited space, instead of, as shown, a row of receptacle funnels which are arranged in a line in a one-dimensional pattern. In this context, it should again be pointed out that the curvature of plate 24 and covering 27 is in no way necessary and that plate 24 and cover 27 may also be of flat design, with a three-dimensional pattern of receptacle funnels. It is also pointed out that other means than a pendant structure can be used to manipulate the relative position of the outlet opening 26, on the one hand, and the receptacle funnels 21–23, on the other hand.

What is claimed is:

1. Device for distributing liquid to a number of consumers, in particular for use in a drinks machine, comprising:

a number of receptacles which are positioned next to one another corresponding to the number of consumers;

a liquid feed line having an outlet opening which opens out above the receptacles;

manipulation means for positioning the outlet opening above a specific receptacle which is to be supplied, by manipulation of the relative position of the outlet opening, on the one hand, and the receptacles, on the other hand, characterized in that at the outlet end of the liquid feed line there is provided a cover which extends laterally with respect to the liquid feed line and extends at least as far as the receptacles which in each case adjoin the receptacle which is to be supplied.

2. Device according to claim 1, characterized in that the cover extends at least as far as above the said adjacent receptacles, and preferably completely overlaps these adjacent receptacles.

3. Device according to claim 1, characterized in that the cover extends over all the receptacles and preferably substantially encloses the space above the receptacles.

4. Device according to claim 1, characterized in that the receptacles are formed or accommodated in a plate and in that the cover runs parallel to and along the said plate.

5. Device according to claim 4, characterized in that at least two adjacent receptacles of the said number of receptacles, and preferably all the receptacles, are recessed with respect to the top surface of the plate.

6. Device according to claim 4, characterized in that the top surface of the plate and the bottom surface of the cover are curved in the form of an arc of a circle or spherically, with a corresponding radius of curvature, the top surface of the plate preferably being concavely curved and the bottom surface of the cover being convexly curved.

7. Device according to claim 1, characterized in that the receptacles are funnel-shaped.

8. Device according to claim 1, characterized in that the manipulation means are actively connected to the receptacles, and in that the receptacles are provided with flexible outlet hoses.

9. Device according to claim 1, characterized in that it comprises position-detection means for detecting the relative position of the outlet opening and the receptacles with respect to one another, in that the position-detection means are actively connected to control means which are designed to actuate the manipulation means as a function of the signal emitted by the position-detection means and of a signal input via actuating means.

10. Drinks machine provided with a device for distributing liquid according to claim 1.

11. Drinks machine according to claim 10, characterized in that the inlet end of the liquid feed line is connected to a hot water source.

12. Device according to claim 1, wherein the manipulation device is actively connected to the receptacles, the receptacles are provided with flexible outlet hoses, and the liquid distribution device comprises a position detector for detecting the relative position of the outlet opening with respect to the receptacles and a controller to actuate the manipulator device in response to a signal emitted by the position detector and a signal input via an actuator.

13. A drinks machine provided with a device for distributing liquid according to claim 12 wherein the liquid feed line has an inlet end connected to a hot water source.

14. A liquid distribution device for distributing liquid to a number of consumers, the device comprising:

a) a number of receptacles positioned next to one another, the number of receptacles corresponding to the number of consumers;
b) a liquid feed line having an outlet opening opening out above the receptacles to supply liquid to the receptacles;
c) a manipulation device operable to position the outlet opening relative to the receptacles to locate the outlet opening above a specific one of the receptacles; and
d) a cover disposed at the outlet end of the liquid feed line and extending laterally of the liquid feed line to an extent sufficient to cover other ones of the number of receptacles, said other ones being receptacles adjoining the specific receptacle being supplied with liquid.

15. A liquid distribution device according to claim 14, wherein the cover is movable with the outlet end of the liquid feed line, said movement being relative movement with respect to the receptacles, and the cover has an extent sufficient to completely cover each receptacle immediately adjacent to the specific receptacle.

16. A liquid distribution device according to claim 14, wherein the cover encloses the space above the receptacles.

17. A liquid distribution device according to claim 14, wherein the receptacles are formed or accommodated in a plate and wherein the cover runs parallel to and along the plate.

18. A liquid distribution device according to claim 17, wherein the plate has a top surface and at least two adjacent ones of the receptacles are recessed with respect to the top surface of the plate.

19. A liquid distribution device according to claim 18, wherein the top surface of the plate and the bottom surface of the cover are arcuately or spherically curved and have a corresponding radius of curvature and wherein the top surface of the plate is concavely curved and the plate has a convexly curved bottom surface.

20. A liquid distribution device according to claim 19, wherein the outlet opening is fixed in position relatively to the liquid distribution device, and the receptacles are movable relatively to the liquid distribution device.

* * * * *

UNITED STATES PATENT AND TRADEMARK OFFICE
CERTIFICATE OF CORRECTION

PATENT NO. : 6,640,847 B2
DATED : November 4, 2003
INVENTOR(S) : Verhoven

It is certified that error appears in the above-identified patent and that said Letters Patent is hereby corrected as shown below:

<u>Title page,</u>
Please insert the following Items:

-- [22]  PCT Filed:     Nov. 30, 2000
   [86]  PCT No.        PCT/NL00/00875
         § 371 Date:    April 18, 2002
         § 102(e)Date:  April 18, 2002
   [87]  PCT Pub. No.   WO 01/41094
         PCT Pub. Date: June 7, 2001 --

Signed and Sealed this

Sixth Day of April, 2004

JON W. DUDAS
*Acting Director of the United States Patent and Trademark Office*